US012566261B2

(12) United States Patent
Tojo

(10) Patent No.: US 12,566,261 B2
(45) Date of Patent: Mar. 3, 2026

(54) DETECTING DEVICE AND DETECTION POSITION CALCULATING DEVICE

(71) Applicant: ISUZU MOTORS LIMITED, Tokyo (JP)

(72) Inventor: Tomokazu Tojo, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 320 days.

(21) Appl. No.: 17/759,624

(22) PCT Filed: Jan. 29, 2021

(86) PCT No.: PCT/JP2021/003370
§ 371 (c)(1),
(2) Date: Jul. 28, 2022

(87) PCT Pub. No.: WO2021/153774
PCT Pub. Date: Aug. 5, 2021

(65) Prior Publication Data
US 2023/0112455 A1 Apr. 13, 2023

(30) Foreign Application Priority Data
Jan. 30, 2020 (JP) ................................. 2020-013542

(51) Int. Cl.
*G01S 13/931* (2020.01)
*G01S 13/87* (2006.01)
(Continued)

(52) U.S. Cl.
CPC ............ *G01S 13/931* (2013.01); *G01S 13/87* (2013.01); *G01S 2013/9315* (2020.01);
(Continued)

(58) Field of Classification Search
CPC .................... G01S 13/931; G01S 13/87; G01S 2013/9315; G01S 2013/93271; G01S 2013/93274; G01S 15/931; G01S 17/931
See application file for complete search history.

(56) References Cited

U.S. PATENT DOCUMENTS

| | | | |
|---|---|---|---|
| 5,808,728 A * | 9/1998 | Uehara | ................. G01S 17/931 340/904 |
| 6,268,803 B1 | 7/2001 | Gunderson | |

(Continued)

FOREIGN PATENT DOCUMENTS

| | | |
|---|---|---|
| CN | 102498413 A | 6/2012 |
| CN | 202320180 U | 7/2012 |

(Continued)

OTHER PUBLICATIONS

Machine translation of EP 3456681 (Year: 2019).*

(Continued)

*Primary Examiner* — Matthew M Barker
(74) *Attorney, Agent, or Firm* — Shih IP Law Group, PLLC

(57) ABSTRACT

Disclosed are: a detecting device that efficiently detects objects present around a vehicle; and a detection position calculating device. The detecting device includes: a forward detecting unit that is disposed in the proximity of a front portion of one side portion of a pair of side portions of a cab disposed at a front portion of a vehicle, and that detects an object present in a detection range spreading to the front of a detecting face facing forward from the vehicle; and a side detecting unit that is disposed in the proximity of a rear portion of one side portion of the cab, and that detects an object present in a detection range spreading to the front of a detecting face facing sideways from the vehicle. The forward detecting unit is disposed with the detecting face inclined toward one side portion side as to an orthogonal line (Continued)

orthogonal to a center axis of the vehicle, and the side detecting unit is disposed with the detecting face inclined toward a rear of the vehicle as to the center axis.

3 Claims, 2 Drawing Sheets

(51) Int. Cl.
*G01S 15/931* (2020.01)
*G01S 17/931* (2020.01)

(52) U.S. Cl.
CPC .............. *G01S 2013/93271* (2020.01); *G01S 2013/93274* (2020.01); *G01S 15/931* (2013.01); *G01S 17/931* (2020.01)

(56) References Cited

U.S. PATENT DOCUMENTS

| | | | |
|---|---|---|---|
| 6,642,839 B1 | 11/2003 | Gunderson et al. | |
| 10,173,623 B1* | 1/2019 | Meksavan | G01S 13/87 |
| 11,086,333 B2* | 8/2021 | Balogh | G01S 13/931 |
| 2012/0191298 A1 | 7/2012 | Schwarzhaupt et al. | |
| 2013/0169425 A1* | 7/2013 | Victor | B60Q 9/008 340/435 |
| 2014/0266859 A1* | 9/2014 | Kurihara | G01S 13/87 342/70 |
| 2017/0025019 A1* | 1/2017 | Pink | G01S 17/931 |
| 2017/0298595 A1 | 10/2017 | Machida | |
| 2018/0174327 A1* | 6/2018 | Singh | B60R 1/27 |
| 2019/0086511 A1* | 3/2019 | Takeuchi | G01S 7/0235 |
| 2019/0220034 A1* | 7/2019 | Balogh | G05D 1/0246 |
| 2020/0134396 A1* | 4/2020 | Porta | G01S 13/867 |
| 2020/0241549 A1* | 7/2020 | Tsurumi | G05D 1/0246 |
| 2020/0406834 A1 | 12/2020 | Russell | |
| 2021/0024144 A1* | 1/2021 | Patnaik | G01S 17/931 |
| 2021/0109523 A1* | 4/2021 | Zou | G01S 7/52004 |

FOREIGN PATENT DOCUMENTS

| | | | | |
|---|---|---|---|---|
| CN | 204586671 U | | 8/2015 | |
| CN | 110641367 A | * | 1/2020 | |
| EP | 3456681 A1 | * | 3/2019 | B66F 17/003 |
| JP | 2005199844 A | | 7/2005 | |
| JP | 2008037118 A | | 2/2008 | |
| JP | 2011-063225 A | | 3/2011 | |
| KR | 1020140006305 A | | 1/2014 | |
| WO | 2001/061377 A2 | | 8/2001 | |
| WO | WO-2016065027 A1 | * | 4/2016 | B60Q 9/008 |
| WO | 2016/158255 A1 | | 10/2016 | |
| WO | WO-2020058021 A1 | * | 3/2020 | G01S 13/865 |

OTHER PUBLICATIONS

Machine translation of CN110641367 (Year: 2020).*
International Search Report of PCT/JP2021/003370 dated Apr. 20, 2021.
Dec. 26, 2019, Isuzu Motors Limited, [retrieved on Apr. 5, 2021], Internet <URL:http://web.archive.org/web/20191226113544/https://www.isuzu.co.jp/press/2019/12_26.html>, in particular, see section "Blind Spot Monitor" non-official translation ("Isuzu: Isuzu launched 'GIGA' that improved heavy-duty truck-Evolving functions that won't hit, get tired or break, aiming for a car that can run more").
YouTube[online][video], Dec. 26, 2019, Isuzu Motors Official Channel [official], [retrieved on Oct. 8, 2024], Internet<URL:https://www.youtube.com/watch?v=MU54H7X1qqk>in particular, see 0:06/0:35, 0:09/0:35, 0:18/0:035, non-official translation (GIGA Blind Spot Monitor (BSM)).

* cited by examiner

DETECTING DEVICE AND DETECTION POSITION CALCULATING DEVICE

TECHNICAL FIELD

The present disclosure relates to a detecting apparatus and a detection position calculating apparatus.

BACKGROUND ART

Hitherto, a detecting apparatus that detects an object approaching a vehicle by transmitting millimeter radar waves, for example, to a periphery of the vehicle has been put to practical use. In an apparatus using the detecting apparatus, for example, a blind spot monitor (BSM), a driver who is driving the vehicle is notified of the approaching of an object when the object is detected by the detecting apparatus. As a result, a case where the vehicle collides with the object can be prevented.

For commercial vehicles such as trucks, because of their wider range that cannot be directly viewed by the driver, there is a need for detecting an object in a wide range from the frontward of the vehicle to the sidewards of the vehicle.

Thus, as a technology of detecting an object in a wide range, for example, Patent Literature (hereinafter, abbreviated as PTL) 1 discloses an apparatus in which a millimeter-wave radar is disposed on a front portion of the vehicle and six cameras are disposed on the front portion, both side portions, and a rear portion of the vehicle.

CITATION LIST

Patent Literature

PTL 1

Japanese Patent Application Laid-Open No. 2011-063225

SUMMARY OF INVENTION

Technical Field

However, in the apparatus in PTL 1, a large number of detecting apparatuses are disposed, and it has been difficult to efficiently detect an object by a small number of detecting apparatuses.

An object of the present disclosure is to provide a detecting apparatus and a detection position calculating apparatus that efficiently detect an object that is present in the periphery of the vehicle.

Solution to Problem

A detecting apparatus according to the present disclosure includes: a front-side detection section that is disposed in vicinity of a front portion of one side portion out of a pair of side portions of a cab located in a vehicle front portion and detects an object that is present in a detection range that spreads in front of a detection surface that faces frontward of the vehicle; and a side detection section that is disposed in vicinity of a rear portion of one side portion of the cab and detects an object that is present in a detection range that spreads in front of a detection surface that faces sideward of the vehicle, in which the front-side detection section is disposed to be inclined with respect to an orthogonal line orthogonal to a central axis of the vehicle such that the detection surface faces one side-portion side, and the side detection section is disposed to be inclined with respect to the central axis such that the detection surface faces rearward of the vehicle.

A detection position calculating apparatus according to the present disclosure includes: the detecting apparatus; and a calculating section that calculates a position of the object based on detection information of the detecting apparatus.

Advantageous Effects of Invention

According to the present disclosure, it becomes possible to efficiently detect an object that is present in the periphery of the vehicle.

DESCRIPTION OF EMBODIMENTS

Embodiments according to the present disclosure are described below with reference to the accompanying drawings.

Embodiment 1

Figure 1:
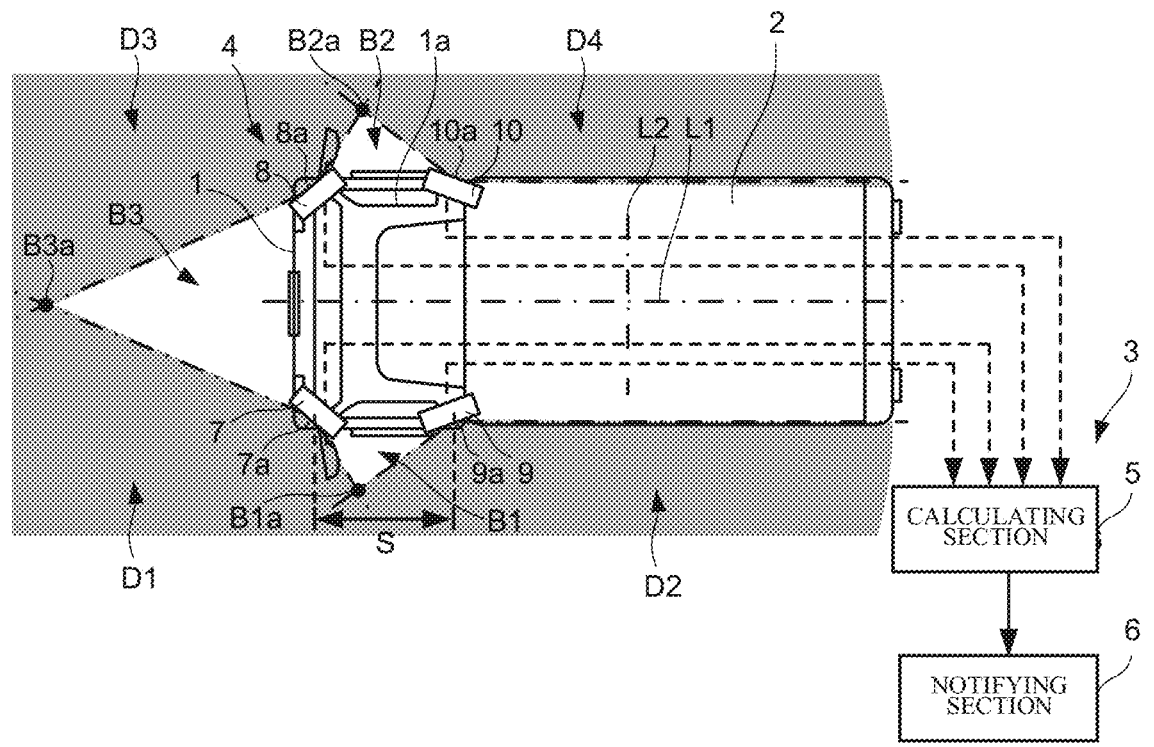
FIG. 1 illustrates a configuration of a vehicle including a detecting apparatus according to Embodiment 1 of the present disclosure.

A configuration of a vehicle including a detecting apparatus according to Embodiment 1 of the present disclosure is illustrated in FIG. 1. The vehicle includes cab 1, truck bed portion 2, and detection position calculating apparatus 3. Examples of the vehicle are commercial vehicles such as a truck.

Cab 1 is for an occupant to board and is disposed in a front portion of the vehicle. On the right-side-portion side of cab 1, driver's seat 1*a* for driving the vehicle is provided. Cab 1 is formed in a length that fits in a front half portion of the vehicle in the vehicle front-rear direction.

Truck bed portion 2 is for placing cargo, for example, thereon, and is disposed on the rear side of the vehicle with respect to cab 1. Truck bed portion 2 is formed to be long in the vehicle front-rear direction so as to extend from the vicinity of a rear portion of cab 1 to a vehicle rear portion.

Detection position calculating apparatus 3 detects the position of an object that is present in the periphery of the vehicle and has detecting apparatus 4, calculating section 5, and notifying section 6. Detection position calculating apparatus 3 can be composed of a blind spot monitor, for example.

Detecting apparatus 4 has a pair of front-side detection sections 7 and 8 and a pair of side detection sections 9 and 10.

Front-side detection section 7 is disposed in the vicinity of a front portion of a left side portion out of a pair of side portions of cab 1, and front-side detection section 8 is disposed in the vicinity of a front portion of a right side portion of cab 1. Side detection section 9 is disposed in the vicinity of a rear portion of the left side portion of cab 1, and side detection section 10 is disposed in the vicinity of a rear portion of the right side portion of cab 1. Front-side detection sections 7 and 8 and side detection sections 9 and 10 detect an object that is present in the periphery of the vehicle and can be composed of millimeter-wave radars that detect an object by transmitting and receiving millimeter waves, for example.

Front-side detection section 7 has flat detection surface 7*a* facing frontward of the vehicle, transmits and receives millimeter waves from detection surface 7*a*, and detects an object that is present in detection range D1 that spreads in front of detection surface 7*a*. Front-side detection section 7 has a plate shape having a wide width in the vehicle width direction and is disposed to be inclined with respect to orthogonal line L2 orthogonal to central axis L1 of the vehicle such that detection surface 7*a* faces the left-side-portion side. Front-side detection section 7 can be formed so as to have detection range D1 of 150 degrees in front of detection surface 7*a*, for example.

Meanwhile, side detection section 9 has flat detection surface 9*a* facing leftward of the vehicle, transmits and receives millimeter waves from detection surface 9*a*, and detects an object that is present in detection range D2 that spreads in front of detection surface 9*a*. Side detection section 9 has a plate shape having a wide width in the front-rear direction and is disposed to be inclined with respect to central axis L1 of the vehicle such that detection surface 9*a* faces rearward of the vehicle. Side detection section 9 can be formed so as to have detection range D2 of 150 degrees in front of detection surface 9*a*, for example.

At this time, side detection section 9 is disposed such that an inclination angle is set such that detection range D2 includes up to a rear portion of a left side portion of the vehicle, in other words, a rear portion of a left side portion of truck bed portion 2. Front-side detection section 7 is disposed such that an inclination angle is set such that detection range D1 of front-side detection section 7 overlaps with detection range D2 of side detection section 9 on the vehicle front side of side detection section 9.

Blank region B1 outside detection ranges D1 and D2 is formed between detection range D1 of front-side detection section 7 and detection range D2 of side detection section 9. Front-side detection section 7 and side detection section 9 are disposed such that inclination angles are set as bellow. Out of three vertices of blank region B1, vertex B1*a* spaced apart from front-side detection section 7 and side detection section 9 to the leftward of the vehicle is positioned in region S between a central portion of front-side detection section 7 and a central portion of side detection section 9 in the vehicle front-rear direction.

Similarly, front-side detection section 8 has flat detection surface 8*a* facing frontward of the vehicle, transmits and receives millimeter waves from detection surface 8*a*, and detects an object that is present in detection range D3 that spreads in front of detection surface 8*a*. Front-side detection section 8 has a plate shape having a wide width in the vehicle width direction and is disposed to be inclined with respect to orthogonal line L2 such that detection surface 8*a* faces the right-side-portion side. Front-side detection section 8 can be formed so as to have detection range D3 of 150 degrees in front of detection surface 8*a*, for example.

Meanwhile, side detection section 10 has flat detection surface 10*a* facing rightward of the vehicle, transmits and receives millimeter waves from detection surface 10*a*, and detects an object that is present in detection range D4 that spreads in front of detection surface 10*a*. Side detection section 10 has a plate shape having a wide width in the front-rear direction and is disposed to be inclined with respect to central axis L1 of the vehicle such that detection surface 10*a* faces rearward of the vehicle. Side detection section 10 can be formed so as to have detection range D4 of 150 degrees in front of detection surface 10*a*, for example.

At this time, side detection section 10 is disposed such that an inclination angle is set such that detection range D4 includes up to a rear portion of a right side portion of the vehicle, in other words, a rear portion of a right side portion of truck bed portion 2. Front-side detection section 8 is disposed such that an inclination angle is set such that detection range D3 of front-side detection section 8 overlaps with detection range D4 of side detection section 10 on the vehicle front side of side detection section 10.

Blank region B2 outside detection ranges D3 and D4 is formed between detection range D3 of front-side detection section 8 and detection range D4 of side detection section 10. Front-side detection section 8 and side detection section 10 are disposed such that inclination angles are set as bellow. Out of three vertices of blank region B2, vertex B2*a* spaced apart from front-side detection section 8 and side detection section 10 to the rightward of the vehicle is positioned between a central portion of front-side detection section 8 and a central portion of side detection section 10 in the vehicle front-rear direction.

Blank region B3 outside detection ranges D1 and D3 is formed between detection range D1 of front-side detection section 7 and detection range D3 of front-side detection section 8. Front-side detection sections 7 and 8 are disposed such that inclination angles are set as bellow. Out of three vertices of blank region B3, vertex B3*a* spaced apart from front-side detection sections 7 and 8 to the frontward of the vehicle is positioned between a central portion of front-side detection section 7 and a central portion of front-side detection section 8 in the vehicle-width direction.

Front-side detection sections 7 and 8 and side detection sections 9 and 10 may be disposed in the same height positions or may be disposed in different height positions. For example, side detection sections 9 and 10 may be disposed in lower positions than front-side detection sections 7 and 8.

Calculating section 5 is connected to each of front-side detection sections 7 and 8 and side detection sections 9 and 10. Calculating section 5 calculates the position of the object on the basis of detection information of detecting apparatus 4. Calculating section 5 determines whether the position of the object is within a predetermined distance from the vehicle, and outputs an approach signal to notifying section 6 when the position of the object is within a predetermined distance.

Notifying section 6 is disposed in cab 1 and is connected to calculating section 5. Notifying section 6 notifies the occupant on board of cab 1 of the approaching of the object on the basis of the approach signal output from calculating section 5.

Next, the operation of Embodiment 1 is described.

First, as illustrated in FIG. 1, millimeter waves are transmitted from and received by front-side detection sections 7 and 8 and side detection sections 9 and 10 in detection ranges D1 to D4, respectively. When the millimeter waves are received by front-side detection sections 7 and 8 and side detection sections 9 and 10, reception signals thereof are output to calculating section 5.

At this time, when an object is present in detection ranges D1 to D4, for example, detection range D1, millimeter waves reflected by the object is received by front-side detection section 7 in a short amount of time, and a reception signal including detection information of the object is output to calculating section 5.

Front-side detection sections 7 and 8 and side detection sections 9 and 10 are disposed only on cab 1. In general, when detection sections as above are disposed on truck bed portion 2, the loading operation may be hindered. For example, there are truck bed portions 2 with various shapes. Therefore, when the detection sections are mounted on truck bed portion 2, mounting positions for the detection sections need to be set for each of truck bed portions 2 with different shapes. Thus, there has been a risk that the design of truck bed portion 2 is hindered. The detection section may not be installable in an appropriate position at which the detection range is not obstructed depending on the type of truck bed portion 2. Therefore, there also has been a risk that the performance of the detection section cannot be sufficiently exhibited. Thus, front-side detection sections 7 and 8, side detection sections 9 and 10 are disposed only on cab 1. As a result, a case where the loading operation is hindered can be prevented.

At this time, front-side detection section 7 is disposed to be inclined with respect to orthogonal line L2 such that detection surface 7a faces the left-side-portion side of the vehicle, and side detection section 9 is disposed to be inclined with respect to central axis L1 such that detection surface 9a faces rearward of the vehicle. As a result, even when front-side detection section 7 and side detection section 9 are disposed only on cab 1, in other words, even without disposing side detection section 9 on truck bed portion 2, an object can be detected in a wide range from the frontward of the vehicle to the leftward of the vehicle. Therefore, an object that is present in the periphery of the vehicle can be efficiently detected by the two detection sections, in other words, front-side detection section 7 and side detection section 9.

Side detection section 9 is disposed to be inclined such that detection range D2 includes up to the rear portion of the left side portion of the vehicle, and front-side detection section 7 is disposed to be inclined such that detection range D1 overlaps with detection range D2 of side detection section 9. As a result, an object can be detected in a wider range from the frontward of the vehicle to a rear portion of the leftward of the vehicle.

Blank region B1 is formed between detection ranges D1 and D2 in accordance with the inclination of side detection section 9. However, blank region B1 is formed leftward of cab 1, and hence can be viewed from driver's seat 1a via a window portion of cab 1. In other words, front-side detection section 7 and side detection section 9 are disposed to be inclined such that blank region B1 is formed in a position viewable from driver's seat 1a and parts that are blind spots from driver's seat 1a are widely included in detection ranges D1 and D2. As a result, an object that is present in leftward of the vehicle can be reliably detected by detection by front-side detection section 7 and side detection section 9 along with viewing from driver's seat 1a.

Front-side detection section 7 and side detection section 9 are disposed to be inclined such that vertex B1a of blank region B1 is positioned in region S in the vehicle front-rear direction. As a result, blank region B1 is formed so as to fit in the leftward of cab 1, in other words, fit in a range that is viewable from driver's seat 1a in a reliable manner, and hence an object can be detected in a more reliable manner.

Similarly, front-side detection section 8 is disposed to be inclined with respect to orthogonal line L2 such that detection surface 8a faces the right-side-portion side of the vehicle, and side detection section 10 is disposed to be inclined with respect to central axis L1 such that detection surface 10a faces rearward of the vehicle. As a result, even when front-side detection section 8 and side detection section 10 are disposed only on cab 1, an object can be detected in a wide range from the frontward of the vehicle to the rightward of the vehicle, and an object that is present in the periphery of the vehicle can be efficiently detected by the two detection sections, in other words, front-side detection section 8 and side detection section 10.

Side detection section 10 is disposed to be inclined such that detection range D4 includes up to the rear portion of the right side portion of the vehicle, and front-side detection section 8 is disposed to be inclined such that detection range D3 overlaps with detection range D4 of side detection section 10. As a result, an object can be detected in a wider range from the frontward of the vehicle to the rear portion of the rightward of the vehicle.

Blank region B2 is formed between detection ranges D3 and D4 in accordance with the inclination of side detection section 10. However, blank region B2 is formed rightward of cab 1, and hence can be viewed from driver's seat 1a via a window portion of cab 1. In other words, front-side detection section 8 and side detection section 10 are disposed to be inclined such that blank region B2 is formed in a position viewable from driver's seat 1a and parts that are blind spots from driver's seat 1a are widely included in detection ranges D3 and D4. As a result, an object that is present rightward of the vehicle can be reliably detected by detection by front-side detection section 8 and side detection section 10 along with viewing from driver's seat 1a.

Front-side detection section 8 and side detection section 10 are disposed to be inclined such that vertex B2a of blank region B2 is positioned between front-side detection section 8 and side detection section 10 in the vehicle front-rear direction. As a result, blank region B2 is formed so as to fit in the rightward of cab 1, in other words, fit in a range that is viewable from driver's seat 1a in a reliable manner, and hence an object can be detected in a more reliable manner.

Meanwhile, on the frontward of the vehicle, blank region B3 is formed between detection range D1 and detection range D3 in accordance with the inclination of front-side detection sections 7 and 8. However, blank region B3 is formed frontward of driver's seat 1a, and hence can be viewed from driver's seat 1a via windshield of cab 1. In other words, front-side detection sections 7 and 8 are disposed to be inclined within a range in which blank region B3 has a size that is viewable from driver's seat 1a. As a result, an object that is present frontward of the vehicle can be detected in a more reliable manner by detection by front-side detection sections 7 and 8 along with viewing from driver's seat 1a.

Front-side detection sections 7 and 8 are disposed to be inclined such that vertex B3a of blank region B3 is positioned between front-side detection section 7 and front-side detection section 8 in the vehicle width direction. As a result, blank region B3 is formed so as to fit in the frontward of cab 1, in other words, fit in a range that is viewable from driver's seat 1a in a reliable manner, and hence an object can be detected in a more reliable manner.

Front-side detection section 7 and side detection section 9 can be disposed to be inclined such that vertex B1a of blank region B1 is positioned frontward of the vehicle with respect to a central portion between front-side detection section 7 and side detection section 9. In other words, front-side detection section 7 can be caused to face frontward of the vehicle by reducing the inclination angle of front-side detection section 7 with respect to orthogonal line L2. As a result, blank region B3 can be formed in a small manner, and an object that is present frontward of the vehicle can be detected by front-side detection section 7 in a more reliable manner.

Similarly, front-side detection section 8 and side detection section 10 can be disposed to be inclined such that vertex B2a of blank region B2 is positioned frontward of the vehicle with respect to a central portion between front-side detection section 8 and side detection section 10. As a result, blank region B3 can be formed in a small manner, and an object that is present frontward of the vehicle can be detected by front-side detection section 8 in a more reliable manner.

Front-side detection section 7 and side detection section 9 are preferably disposed to be inclined such that the sum of the area of blank region B1 and the area of blank region B3 becomes the minimum. As a result, front-side detection section 7 and side detection section 9 can detect objects that are present frontward of the vehicle and leftward of the vehicle in a more reliable manner.

Similarly, front-side detection section 8 and side detection section 10 are preferably disposed to be inclined such that the sum of the area of blank region B2 and the area of blank region B3 becomes the minimum. As a result, front-side detection section 8 and side detection section 10 can detect objects that are present frontward of the vehicle and rightward of the vehicle in a more reliable manner.

As above, detection signals obtained by detecting an object by front-side detection sections 7 and 8, side detection sections 9 and 10 are output to calculating section 5. Calculating section 5 acquires detection information on the object from the reception signals sequentially output from front-side detection sections 7 and 8 and side detection sections 9 and 10 and calculates the position of the object with respect to the vehicle on the basis of the detection information. Next, calculating section 5 determines whether the position of the object is within a predetermined distance from the vehicle, and outputs an approach signal to notifying section 6 when the position of the object is within a predetermined distance. Notifying section 6 notifies the occupant on board of cab 1 of the approaching of the object on the basis of the approach signal output from calculating section 5.

At this time, front-side detection sections 7 and 8 and side detection sections 9 and 10 detect an object in a wide range from the frontward of the vehicle to both of the sidewards of the vehicle, and hence notifying section 6 can give a notification of the approaching of an object with high accuracy.

According to the present embodiment, front-side detection section 7 is disposed to be inclined with respect to orthogonal line L2 such that detection surface 7a faces the left-side-portion side, and side detection section 9 is disposed to be inclined with respect to central axis L1 such that detection surface 9a faces rearward of the vehicle. As a result, even when front-side detection section 7 and side detection section 9 are disposed only on cab 1, an object can be detected in a wide range from the frontward of the vehicle to the leftward of the vehicle, and an object that is present in the periphery of the vehicle can be efficiently detected.

Embodiment 2

Embodiment 2 of the present disclosure is described below. Differences from Embodiment 1 are mainly described. Common reference characters are used for features in common with Embodiment 1, and detailed description thereof is omitted.

In Embodiment 1, front-side detection section 7, side detection section 9, front-side detection section 8, and side detection section 10 are disposed to be inclined such that detection regions D1 and D2 and detection regions D3 and D4 that are substantially the same sizes are formed. However, front-side detection sections 7 and 8 only need to be disposed to be inclined with respect to orthogonal line L2 such that detection surfaces 7a and 8a face the left-side-portion side and the right-side-portion side, respectively, and side detection sections 9 and 10 only need to be disposed to be inclined with respect to central axis L1 such that detection surfaces 9a and 10a face rearward of the vehicle, and are not limited to the above.

Figure 2:
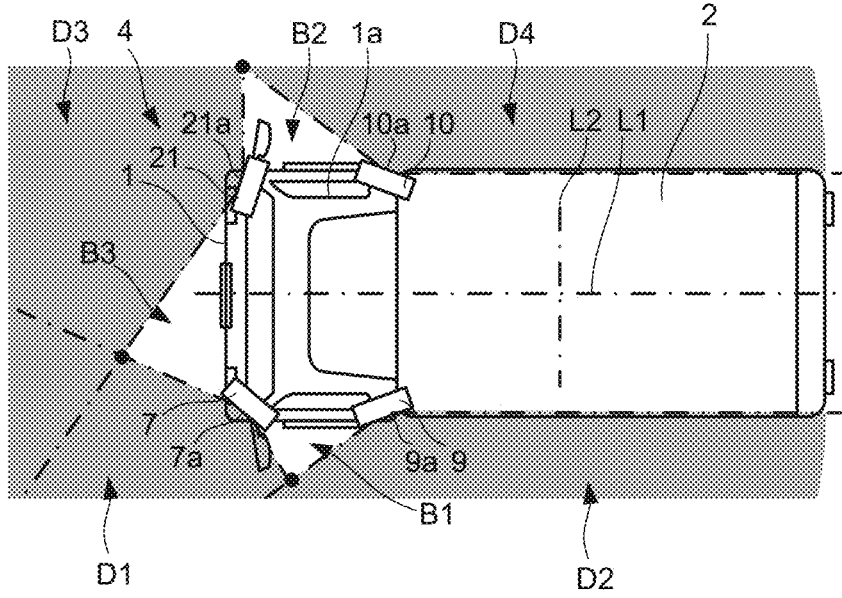
FIG. 2 illustrates a configuration of a detecting apparatus according to Embodiment 2.

For example, as illustrated in FIG. 2, front-side detection section 21 can be disposed instead of front-side detection section 8 in Embodiment 1.

As with front-side detection section 8 in Embodiment 1, front-side detection section 21 has flat detection surface 21a facing frontward of the vehicle, transmits and receives millimeter waves from detection surface 21a, and detects an object that is present in detection range D3 that spreads in front of detection surface 21a. Front-side detection section 21 has a plate shape having a wide width in the vehicle width direction and is disposed to be inclined with respect to orthogonal line L2 such that detection surface 21a faces the right-side-portion side.

Front-side detection section 21 is disposed to have a smaller inclination angle with respect to orthogonal line L2 as compared to front-side detection section 7. In other words, front-side detection section 21 is disposed such that detection surface 21a faces frontward more than front-side detection section 7.

As a result, blank region B2 larger than blank region B1 formed between detection range D1 of front-side detection section 7 and detection range D2 of side detection section 9 is formed between detection range D3 of front-side detection section 21 and detection range D4 of side detection section 10. In other words, front-side detection section 21 and side detection section 10 are disposed to be inclined such that the area of blank region B2 becomes larger than the area of blank region B1.

By such configuration, an object that is present in the periphery of the vehicle is detected by transmitting and receiving millimeter waves from front-side detection sections 7 and 21 and side detection sections 9 and 10.

Front-side detection section 21 and side detection section 10 are disposed with different inclination angles such that blank region B3 decreases as blank region B2 increases. Therefore, an object that is present frontward of the vehicle can be detected by front-side detection sections 7 and 21 in a more reliable manner. At this time, blank region B2 is formed rightward of cab 1 in which driver's seat 1a is provided, and viewing from driver's seat 1a can be more satisfactory as compared to blank region B1. In other words, blank region B2 in which visibility from driver's seat 1a is high is formed in a large manner while blank region B3 is formed in a small manner. As a result, the detection accuracy of an object frontward of the vehicle can be improved while the detection accuracy of an object rightward of the vehicle can be maintained.

In the present embodiment, front-side detection section 21 is disposed to have a smaller inclination angle with respect to orthogonal line L2 as compared to front-side detection section 7, but front-side detection section 21 and side detection section 10 only need to be able to be disposed to be inclined such that the area of blank region B2 formed on driver's seat 1a side is larger than the area of blank region B1, and are not limited to the above. In other words, the inclination angles of front-side detection section 21 and side detection section 10 can be changed such that the detection accuracy of an object is improved as blank region B2 is formed in a larger size. As a result, the detection accuracy of an object frontward of the vehicle can be improved while the detection accuracy of an object rightward of the vehicle can be maintained.

According to the present embodiment, front-side detection section 21 and side detection section 10 are disposed to be inclined such that the area of blank region B2 becomes larger than the area of blank region B1, and hence the detection accuracy of an object frontward of the vehicle can be improved while the detection accuracy of an object rightward of the vehicle can be maintained.

Embodiment 3

Embodiment 3 of the present disclosure is described below. Differences from Embodiments 1 and 2 are mainly described. Common reference characters are used for features in common with Embodiments 1 and 2, and detailed description thereof is omitted.

In Embodiments 1 and 2, front-side detection section 7 and side detection section 9 can be disposed to be inclined such that vertex B1$a$ of blank region B1 is positioned frontward of the vehicle with respect to a central portion between front-side detection section 7 and side detection section 9, but front-side detection section 7 and side detection section 9 only need to be disposed in an inclined manner and are not limited to the above.

Figure 3:
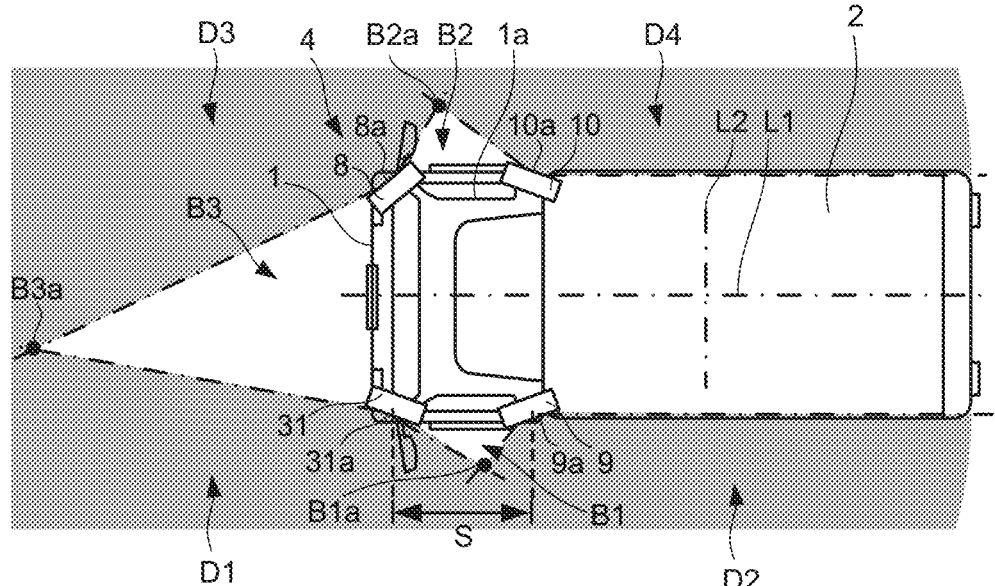
FIG. 3 illustrates a configuration of a detecting apparatus according to Embodiment 3.

For example, as illustrated in FIG. 3, front-side detection section 31 can be disposed instead of front-side detection section 7 in Embodiment 1.

As with front-side detection section 7 in Embodiment 1, front-side detection section 31 has flat detection surface 31$a$ facing frontward of the vehicle, transmits and receives millimeter waves from detection surface 31$a$, and detects an object that is present in detection range D1 that spreads in front of detection surface 31$a$. Front-side detection section 31 has a plate shape having a wide width in the vehicle width direction and is disposed to be inclined with respect to orthogonal line L2 such that detection surface 31$a$ faces the left-side-portion side.

Front-side detection section 31 is disposed at a larger inclination angle with respect to orthogonal line L2, in other words, disposed such that detection surface 31$a$ faces leftward more than front-side detection section 8. Accordingly, the position of vertex B1$a$ of blank region B1 formed between detection range D1 of front-side detection section 31 and detection range D2 of side detection section 9 moves rearward of the vehicle. In other words, front-side detection section 31 and side detection section 9 are disposed to be inclined such that vertex B1$a$ of blank region B1 is positioned rearward of the vehicle with respect to a central portion between front-side detection section 31 and side detection section 9.

By such configuration, an object that is present in the periphery of the vehicle is detected by transmitting and receiving millimeter waves from front-side detection sections 31 and 8 and side detection sections 9 and 10.

At this time, front-side detection section 31 and side detection section 9 are disposed to be inclined such that vertex B1$a$ of blank region B1 is positioned rearward of the vehicle with respect to a central portion between front-side detection section 31 and side detection section 9. As a result, blank region B1 can be formed in a small manner, and an object that is present leftward of the vehicle can be detected by front-side detection section 31 and side detection section 9 in a more reliable manner. Blank region B3 is formed in a large manner but is positioned frontward of the vehicle, and hence can be viewed from driver's seat 1$a$ in a satisfactory manner. In other words, blank region B3 in which visibility from driver's seat 1$a$ is high is formed in a large manner while blank region B1 is formed in a small manner. As a result, the detection range of an object leftward of the vehicle can be widened while the detection accuracy of an object frontward of the vehicle can be maintained.

In the present embodiment, front-side detection section 31 is disposed to have a large inclination angle with respect to orthogonal line L2 as compared to front-side detection section 8, but front-side detection section 31 and side detection section 9 only need to be disposed to be inclined such that vertex B1$a$ of blank region B1 is positioned rearward of the vehicle with respect to a central portion between front-side detection section 31 and side detection section 9 and are not limited to the above.

According to the present embodiment, front-side detection section 31 and side detection section 9 are disposed to be inclined such that vertex B1$a$ of blank region B1 is positioned rearward of the vehicle with respect to a central portion between front-side detection section 31 and side detection section 9. Therefore, blank region B1 can be formed in a small manner, and the detection range of an object leftward of the vehicle can be widened.

In the present embodiment, front-side detection section 8 and side detection section 10 can also be disposed to be inclined such that vertex B2$a$ of blank region B2 is positioned rearward of the vehicle with respect to a central portion between front-side detection section 8 and side detection section 10. As a result, blank region B2 can be formed in a small manner, and the detection range of an object rightward of the vehicle can be widened.

In Embodiments 1 to 3, side detection sections 9 and 10 are disposed to be inclined such that the detection range includes up to the rear portions of the side portions of the vehicle, but side detection sections 9 and 10 only need to be disposed to be inclined with respect to central axis L1 such that detection surfaces 9$a$ and 10$a$ face rearward of the vehicle and are not limited to the above.

In Embodiments 1 to 3, the front-side detection section and side detection section 9 are disposed to be inclined such that vertex B1$a$ of blank region B1 is positioned between the front-side detection section and side detection section 9 in the vehicle front-rear direction. However, the front-side detection section only needs to be disposed to be inclined such that the detection surface faces the left-side-portion side, and side detection section 9 only needs to be disposed to be inclined such that detection surface 9$a$ faces rearward of the vehicle, and the front-side detection section and side detection section 9 are not limited to the above. In other words, the front-side detection section and side detection section 9 can also be disposed such that vertex B1$a$ is positioned on the outer side of region S.

Similarly, in Embodiments 1 to 3, the front-side detection section and side detection section 10 are disposed to be inclined such that vertex B2$a$ of blank region B2 is positioned between the front-side detection section and side detection section 10 in the vehicle front-rear direction. However, the front-side detection section only needs to be disposed to be inclined such that the detection surface faces the right-side-portion side, side detection section 10 only needs to be disposed to be inclined such that detection surface 10a faces rearward of the vehicle, and the front-side detection section and side detection section 10 are not limited to the above.

In Embodiments 1 to 3, one pair of front-side detection sections are disposed to be inclined such that vertex B3a of blank region B3 is positioned between one pair of front-side detection sections in the vehicle width direction. However, the front-side detection section on the vehicle left side only needs to be disposed to be inclined such that the detection surface faces the left-side-portion side, the front-side detection section on the vehicle right side only needs to be disposed to be inclined such that the detection surface faces the right-side-portion side, and the front-side detection sections are not limited to the above.

In Embodiments 1 to 3, one pair of front-side detection sections and one pair of side detection sections 9 and 10 are composed of millimeter-wave radars, but only need to be able to detect an object that is present in the detection range and are not limited to the above. For example, one pair of front-side detection sections and one pair of side detection sections 9 and 10 can also be composed of ultrasonic sensors, laser radars, cameras, and the like. However, one pair of front-side detection sections and one pair of side detection sections 9 and 10 are preferably composed of millimeter-wave radars from the viewpoint of a straight advancing property.

In Embodiments 1 to 3, one pair of front-side detection sections and one pair of side detection sections 9 and 10 are all composed of the same type of detection sections, in other words, all composed of millimeter-wave radars, but can be composed of detection sections of types that are different from each other.

In Embodiments 1 to 3, one pair of front-side detection sections and one pair of side detection sections 9 and 10 are disposed on cab 1. However, each of the front-side detection sections only needs to be disposed in the vicinity of the front portion of one side portion of cab 1, each of the side detection sections only needs to be disposed in the vicinity of the rear portion of one side portion of cab 1, and the front-side detection sections and the side detection sections are not limited to the above. For example, a new detection section can be disposed between the front-side detection section and the side detection section.

In Embodiments 1 to 3, truck bed portion 2 is disposed for placing cargo thereon, but only needs to be a portion disposed on the rear side of the vehicle with respect to cab 1 and is not limited to the above.

The present application is based on Japanese Patent Application (Japanese Patent Application No. 2020-013542) filed on Jan. 30, 2020, the content of which is incorporated herein by reference.

The abovementioned embodiments are merely examples of realizations for carrying out the present invention, and the interpretation of the technical scope of the present invention is not to be limited by those embodiments. In other words, the present invention can be carried out in various forms without departing from the gist or the main features of the present invention. For example, the disclosure of the shapes, numbers and the like of the sections described in the abovementioned embodiments is only exemplifications and can be carried out while being changed, as appropriate.

INDUSTRIAL APPLICABILITY

The detecting apparatus according to the present disclosure can be utilized as an apparatus that is disposed on a cab and detects an object that is present in the periphery of a vehicle.

REFERENCE SIGNS LIST

1 Cab
1a Driver's seat
2 Truck bed portion
3 Detection position calculating apparatus
4 Detecting apparatus
5 Calculating section
6 Notifying section
7, 8, 21, 31 Front-side detection section
9, 10 Side detection section
7a, 8a, 9a, 10a, 21a, 31a Detection surface
D1, D2, D3, D4 Detection range
B1, B2, B3 Blank region
B1a, B2a, B3a Vertex
S Region
L1 Central axis
L2 Orthogonal line

What is claimed is:

1. A vehicle equipped with a cab, a truck bed portion arranged behind the cab, and a detecting apparatus that detects objects surrounding the vehicle, the detecting apparatus; comprising:

a first front-side detector that is disposed in vicinity of a front portion of one side portion out of a pair of side portions of the cab located in a front portion of the vehicle and detects an object that is present in a detection range that spreads in front of a detection surface that faces frontward of the vehicle;

a second front-side detector that is disposed in vicinity of the front portion of the other side portion out of the pair of side portions of the cab and detects an object that is present in a detection range that spreads in front of a detection surface that faces frontward of the vehicle;

a first side detector that is disposed in vicinity of a rear portion of the one side portion of the cab and detects an object that is present in a detection range that spreads in front of a detection surface that faces sideward of the vehicle; and a second side detector that is disposed in vicinity of a rear portion of the other side portion of the cab and detects an object that is present in a detection range that spreads in front of a detection surface that faces sideward of the vehicle, wherein the first front-side detector is disposed to be inclined with respect to an orthogonal line orthogonal to a central axis of the vehicle such that the detection surface faces the one side-portion side of the cab;

the second front-side detector is disposed to be inclined with respect to an orthogonal line orthogonal to a central axis of the vehicle such that the detection surface faces the other side-portion side of the cab;

the first side detector is disposed to be inclined with respect to the central axis such that the detection surface faces rearward of the vehicle;

the second side detector is disposed to be inclined with respect to the central axis such that the detection surface faces rearward of the vehicle;

the first front-side detector and the first side detector are disposed such that their detection ranges overlap each other;

the second front-side detector and the second side detector are disposed such that their detection ranges overlap each other;

the other side portion is located on a driver's seat side;

the second front-side detector is disposed such that the detection surface of the second front-side detector faces further forward of the vehicle than the detection surface of the first front-side detector, whereby an area of a second blank region formed between the detection range of the second front-side detector and the detection range of the second side detector is larger than an area of a first blank region formed between the detection range of the first front-side detector and the detection range of the first side detector, wherein the first front-side detector and the first side detector are positioned to be inclined such that a first vertex, spaced apart from the first front-side detector and the first side detector to a sideward of the vehicle out of vertices of the first blank region, is positioned between the first front-side detector and the first side detector in a vehicle front-rear direction, and the second front-side detector and the second side detector are positioned to be inclined such that a second vertex, spaced apart from the second front-side detector and the second side detector to a sideward of the vehicle out of vertices of the second blank region, is positioned between the second front-side detector and the second side detector in a vehicle front-rear direction, and no detector for detecting surrounding objects of the vehicle is attached to the truck bed portion.

2. The vehicle according to claim 1, wherein the first front-side detector and the first side detector are disposed to be inclined such that the first vertex is positioned frontward of the vehicle with respect to a central portion between the first front-side detector and the first side detector, and the second front-side detector and the second side detector are disposed to be inclined such that the second vertex is positioned frontward of the vehicle with respect to a central portion between the second front-side detector and the second side detector.

3. The vehicle according to claim 1, wherein each of the first front-side detector, the first side detector, the second front-side detector, and the second side detector is a radar.

* * * * *